United States Patent
Leemet et al.

(10) Patent No.: US 9,774,460 B2
(45) Date of Patent: *Sep. 26, 2017

(54) DETERMINING USAGE PREDICTIONS AND DETECTING ANOMALOUS USER ACTIVITY THROUGH TRAFFIC PATTERNS

(71) Applicants: Jaan Leemet, Aventura, FL (US); Daniel Rudich, Austin, TX (US)

(72) Inventors: Jaan Leemet, Aventura, FL (US); Daniel Rudich, Austin, TX (US)

(73) Assignee: Tangoe Canada, Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,668

(22) Filed: Sep. 22, 2016

(65) Prior Publication Data

US 2017/0012790 A1    Jan. 12, 2017

Related U.S. Application Data

(63) Continuation of application No. 14/704,547, filed on May 5, 2015, now Pat. No. 9,467,572, which is a continuation of application No. 13/938,655, filed on Jul. 10, 2013, now Pat. No. 9,055,431, which is a continuation of application No. 12/836,094, filed on Jul. 14, 2010, now Pat. No. 8,582,457.

(30) Foreign Application Priority Data

Jul. 17, 2009  (CA) .................................... 2673135

(51) Int. Cl.
| | |
|---|---|
| *H04W 4/26* | (2009.01) |
| *H04L 12/14* | (2006.01) |
| *H04L 12/24* | (2006.01) |
| *H04L 12/26* | (2006.01) |
| *H04L 29/06* | (2006.01) |
| *H04M 15/00* | (2006.01) |

(52) U.S. Cl.
CPC .......... *H04L 12/1403* (2013.01); *H04L 12/14* (2013.01); *H04L 12/1485* (2013.01); *H04L 41/142* (2013.01); *H04L 43/16* (2013.01); *H04L 63/1425* (2013.01); *H04M 15/47* (2013.01); *H04W 4/26* (2013.01)

(58) Field of Classification Search
CPC ....... H04L 12/26; H04L 12/28; H04L 1/0026; H04L 2001/0092; H04L 1/1812; H04L 1/203; H04W 4/06; H04W 72/00; H04W 72/04; H04W 4/26; H04B 7/216
See application file for complete search history.

(56) References Cited

U.S. PATENT DOCUMENTS

| | | |
|---|---|---|
| 7,539,147 B2 | 5/2009 | Chang et al. |
| 7,650,137 B2 | 1/2010 | Jobs et al. |
| 2005/0182718 A1 | 8/2005 | Kortum et al. |

(Continued)

FOREIGN PATENT DOCUMENTS

WO    2008052291 A2    5/2008

*Primary Examiner* — Anez Ebrahim
(74) *Attorney, Agent, or Firm* — St. Onge Steward Johnston & Reens, LLC

(57) ABSTRACT

A system for selecting and monitoring data plans for telecommunications systems, and methods of determining, learning and estimating usage patterns in-order to predict usage and tie this to cost and the overlaying of plan selection for cost optimization. Further, additional methods are applied to determine anomalous user behaviors and raise security and data leakage related events.

20 Claims, 7 Drawing Sheets

(56) References Cited

U.S. PATENT DOCUMENTS

| | | |
|---|---|---|
| 2008/0222717 A1 | 9/2008 | Rothstein et al. |
| 2008/0232371 A1 | 9/2008 | Hildreth et al. |
| 2009/0054030 A1 | 2/2009 | Golds |
| 2009/0138590 A1 | 5/2009 | Lee et al. |
| 2010/0017506 A1 | 1/2010 | Fadell |
| 2010/0110890 A1 | 5/2010 | Rainer et al. |
| 2010/0330953 A1 | 12/2010 | Rogel et al. |

FIG. 4

DETERMINING USAGE PREDICTIONS AND DETECTING ANOMALOUS USER ACTIVITY THROUGH TRAFFIC PATTERNS

FIELD OF THE INVENTION

The present invention relates to anomaly detection and bandwidth monitoring and management, and more specifically to the management of data plans within a telecommunications system and the determination of optimal data plans and anomalies as related to users using these plans.

BACKGROUND OF THE INVENTION

The present invention relates to anomaly detection and bandwidth monitoring and management, and more specifically to the management of data plans within a telecommunications system and the determination of optimal data plans and anomalies as related to users using these plans.

Consequently, carriers and service operators are forced to compete across similar technologies to offer mobile communication solutions. Competition, while somewhat determined by device availability and network coverage, is generally linked to the 'data plan' which is offered to the end users and determines the cost. These data plans change frequently, are often tied to multiple users (pooling), and may offer tiered (flex) options allowing users to jump across plans when they go over the pre-established limits. The data overage charges are typically large (often measured in dollars per megabyte), and can add up to a multi-hundred or even multi-thousand dollar charge in a single monthly plan period.

For example, a typical North American Data Plan for a BlackBerry™, Smart Phone or Mobile Broadband USB Modem typically costs approximately $50 per month for a set amount of bandwidth usage. However, if the use exceeds this data limit there are overage charges for all consumption above the allotted limits. These overage charges typically have a cost per megabyte far higher than the Data Plan itself and are often considered punitive.

Users, both corporate and consumer rarely know their data usage needs. Unlike the minutes required on a cell phone for a month, which is more tangible as users can relate to the 'time they spent on the phone', data transfer sizes vary depending on compression, resolution, and can often be consumed by background update tasks, antivirus, operating system updates etc. It is difficult for the average user to assess their data usage needs or history.

The conundrum presents itself when carriers want to lock users into a term of contract which is based on data usage when making the sale. To address this, a carrier will typically ask questions about the usage patterns such as: do you use your card to download videos, only for email, or for web browsing. This is used to force the user into some broad categories but is unlikely to be accurate. The end result is that there is either an over purchase of bandwidth or a surprise overage charge for the end user.

There are also security concerns for the enterprise IT department when deploying data access through these devices on public networks. These departments and their users are traditionally locked down with firewalls, proxies, and numerous security and monitoring systems tied into physical access into the corporate LAN/WAN, mobile computers on public networks disappear from the monitoring systems unless forced into using them with VPNs. Existing monitoring methods are generally based on hardware installed in the IT infrastructure of the enterprise, and protect the 'core networks' in the office. These systems are not able to monitor the users when using their communications devices on public networks outside the office environment Prior art relating to anomalous activities such as US2008/0222717 relate anomalies for detecting traffic between users and source/destination based anomalies. However, the anomalies are not related to usage costing, nor are anomalies learned by the system to reduce the volume of anomalies and simplify the determination of anomalies for the end user.

Other prior art such as US2009/0138590 are related to attack prevention based on anomalous activity.

WO/2008/05229 relates to the usage of source and destination addresses used in packet headers to see if anomalous patterns exist in the senders and recipients of data.

U.S. Pat. No. 7,539,147 also teaches a method to detect traffic anomalies relating to attack prevention.

In essence there are a number of different anomalous activities which can be monitored for different reasons on network traffic. The proposed invention considers anomalies based on usage traffic patterns, and a learned behavioral model of traffic usage for plan and cost optimization. It also relates usage data back to a central administrative console capable of managing complex multi-user and interdependent carrier plans allowing the selection and optimization of users and groups and the assigned plans for each.

Related systems exist today, which propose post plan processing methods to review the plan costs from prior months to assess usage, and assist in the selection of new plans. This does not address the real time requirements to avoid overages in the current month such as the proposed current invention. Additionally, existing end user monitoring systems which exist today and run on the end device only, to count and monitor data, do not take into account pooled or flex plan capabilities offered by many carriers which require monitoring from a central service and data aggregation and consolidation. These systems also do not take into effect the usage anomalies and relate these to the security functions as in the current proposed invention.

Existing monitoring systems for anomalies on the end user system are based on key loggers, antivirus/firewalls, and usage monitoring. The logs and events generated by these systems are extensive and a burden to review by the IT manager. These systems also log events as they happen, and do not predict anomalies as does the current invention, allowing the IT manager to react in a pro-active way. Further, many companies have periods where traffic patterns may vary greatly based on time of day, time of week, or time of month/year. Examples include end of week time card entry, end of month accounting events, and end of year inventory. Existing systems do not have the learning capability that the present invention offers to determine true anomalies within these normal trends. Most users and groups of users will also trend up or down over time with their usage as new applications are added or as users rely more on their mobile devices or as more applications become available for mobile users. Existing systems do not have the learning capability of the proposed invention to adjust with these trends and mask out false anomalies caused by this trending.

The current invention learns and adjusts to anomalies rather than forcing the users to define hard rules for them.

SUMMARY OF THE INVENTION

It is therefore an object of the invention to provide a system and method of managing telecommunications plans and monitoring data usage patterns and detecting anomalies based on these patterns.

More specifically, it is an object of the invention to provide a method of monitoring, distributing, and configuring data plans and their parameters independent of carrier and of technology through a central management console and related components and a remote agent resident on the device(s) with deploy the telecommunications technology. This system will also collect data through an established communications channel between the central and remote agents, and process the data to determine usage trends, patterns, and anomalies as well as predict these and propose changes to plans. Accumulated data on the agent is reported back in an efficient manner to the consolidation system, which is capable of combining multiple users' data for the basis of shared/pooled plans. The central server system maintains knowledge of carrier plan offerings to manage flex and other plan upgrades and recommends plans based on usage history and user trending behavior. The tying of anomalies to usage patterns, the prediction and forecasting of anomalies, the learning behavior adjusting for trends and patterns, the efficient transfer of this data, the simplification of large amounts of data, and the interrelation of the independent users into shared/pooled plans obviates the deficiencies noted in the prior art.

It is a further object of the invention to provide a method which proposes optimal plans automatically based on the historical usage and current usage of users and available plans.

It is a further object of the invention to forward such plan selections, when made, in the form of e-mail messages to a configured administrative user or directly to the carrier to allow for the changing of the users plan.

It is a further object of the invention to forecast and predict overages and anomalies, as well as to provide a graphical user interface that allows the operator to take existing usage data, and predicted data, and to overlay this predicted usage data graphically on the current usage to make a rapid, easy to read determination of possible overages.

It is a further object of the invention to provide a system and a graphical user interface which allows the overlaying of plans on the existing plan selection for 'what-if' analysis should the user have changes or had other existing plans in the system.

It is a further object of the invention to detect and determine the upcoming plan expires and hardware upgrades and to create alerts in the form of email messages, pop-up messages, and visible alerts to the IT administrator assigned to receive such alerts.

It is a further object of the invention to use historical usage data from users, current trend data, and relate these to monthly, yearly usage patterns in determining optimal plan selection and predicted overages and avoid the anomaly alarms for these "normal" abnormal periods.

It is a further object of the invention to show these anomalies and user patterns to the IT administrator in an easy to read and easy to understand fashion.

It is a further object of the invention to minimize the overhead required for the data transferred between the end user device and the central management system through the configuration of desired anomalies and threshold setting parameters.

It is a further object of the invention to provide a central store for use which is capable of real time calculation and generation of pool plan remainders which can be distributed to the users of a pooled plan, thus showing each user the current usage across the pool group.

It is a further object of the invention to allow the configuration and automated distribution of automatic upgrade/flex plans when users over (or under) utilize the allocated bandwidth.

It is a further object of the invention to learn and adjust usage patterns over time and adjust anomaly reporting and usage predictions accordingly so as to avoid false reports and increase accuracy.

It is a further object of the invention to provide the administrator certain powers to eliminate cost and security issues by communicating with the end user, requiring end user acceptance of system guidelines or actually cutting off or throttling the end users bandwidth consumption capabilities.

Various other objects, advantages and features of the present invention will become readily apparent to those of ordinary skill in the art, and the novel features will be particularly pointed out in the appended claims.

BRIEF DESCRIPTION OF THE DRAWINGS

The present invention will be better understood after reading the following description of preferred embodiments thereof, made in reference to the appended drawings in which:

Figure 4:
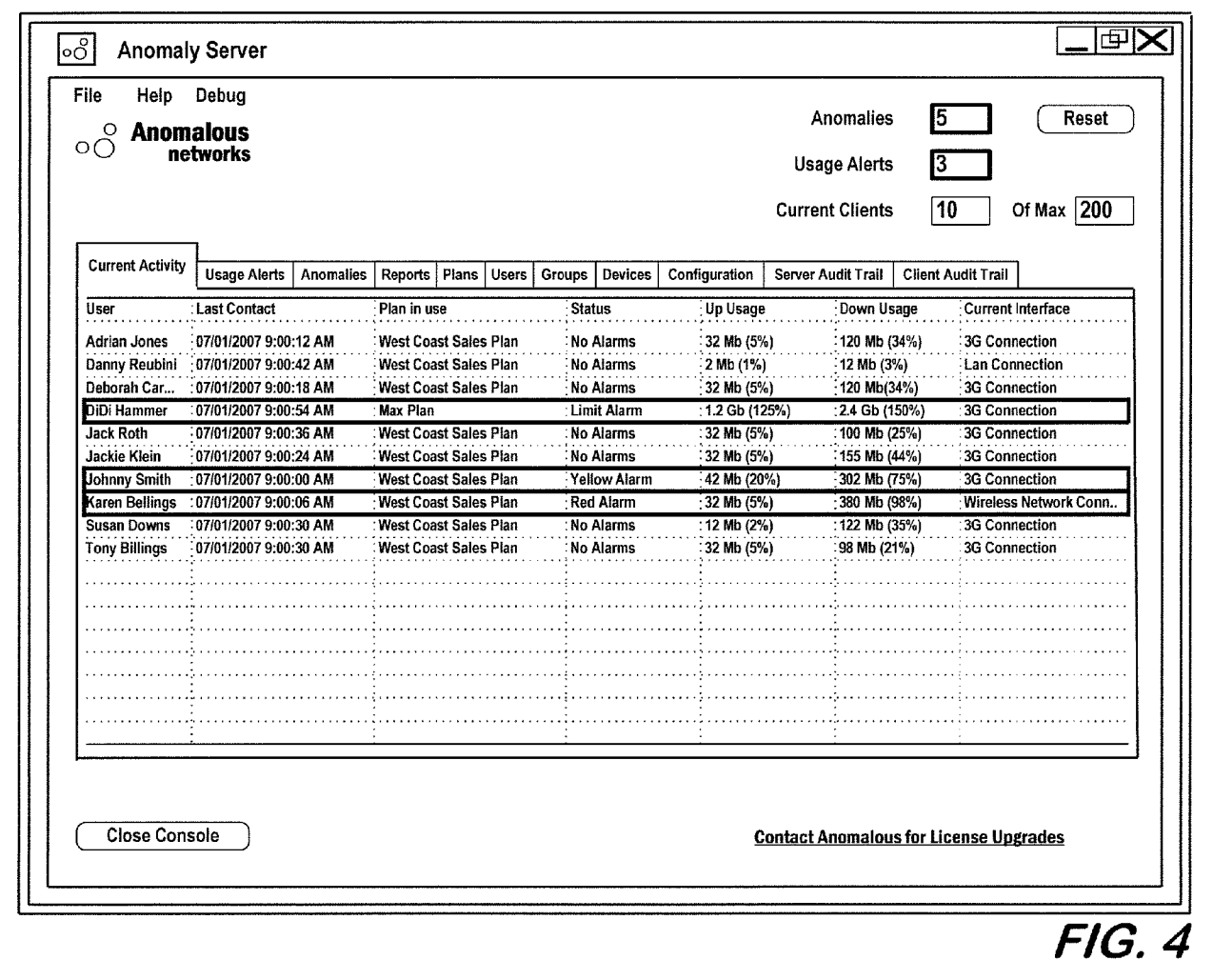

FIG. 4 is an exemplary graphical user interface according to one embodiment of the present invention.

DETAILED DESCRIPTION OF THE INVENTION

The present invention relates to a system for creating, distributing, and monitoring telecommunications data plans. Further, it relates to a process for detecting anomalous user activity through traffic patterns based on data usage and patterns and relating this to security and cost data to determine optimal cost through learned behaviour of past history and usage trends. Additionally, it relates to the determination of anomalies as possible security threats while optimizing costs, minimizing the overhead required to provide such data, and minimizing the volume of data created through this type of monitoring.

The invention, broadly stated, comprises a configuration method and graphical user interface for configuring carrier plans and learned traffic usage related to plans and anomalies derived from this data.

Since telecommunication carriers are competing with complex plans that allow the automatic upgrades based on usage, or the pooling of data across multiple users, the present invention's ability to generate pool plan remainders and to predict overages and calculate 'next upgrade plan' costs into the expense calculations is essential.

The aforementioned link between the plans and usage data is also tied to the predictive capabilities of the current invention in that these same algorithms and techniques/methods are used to determine optimal plans for the users.

Figure 1:
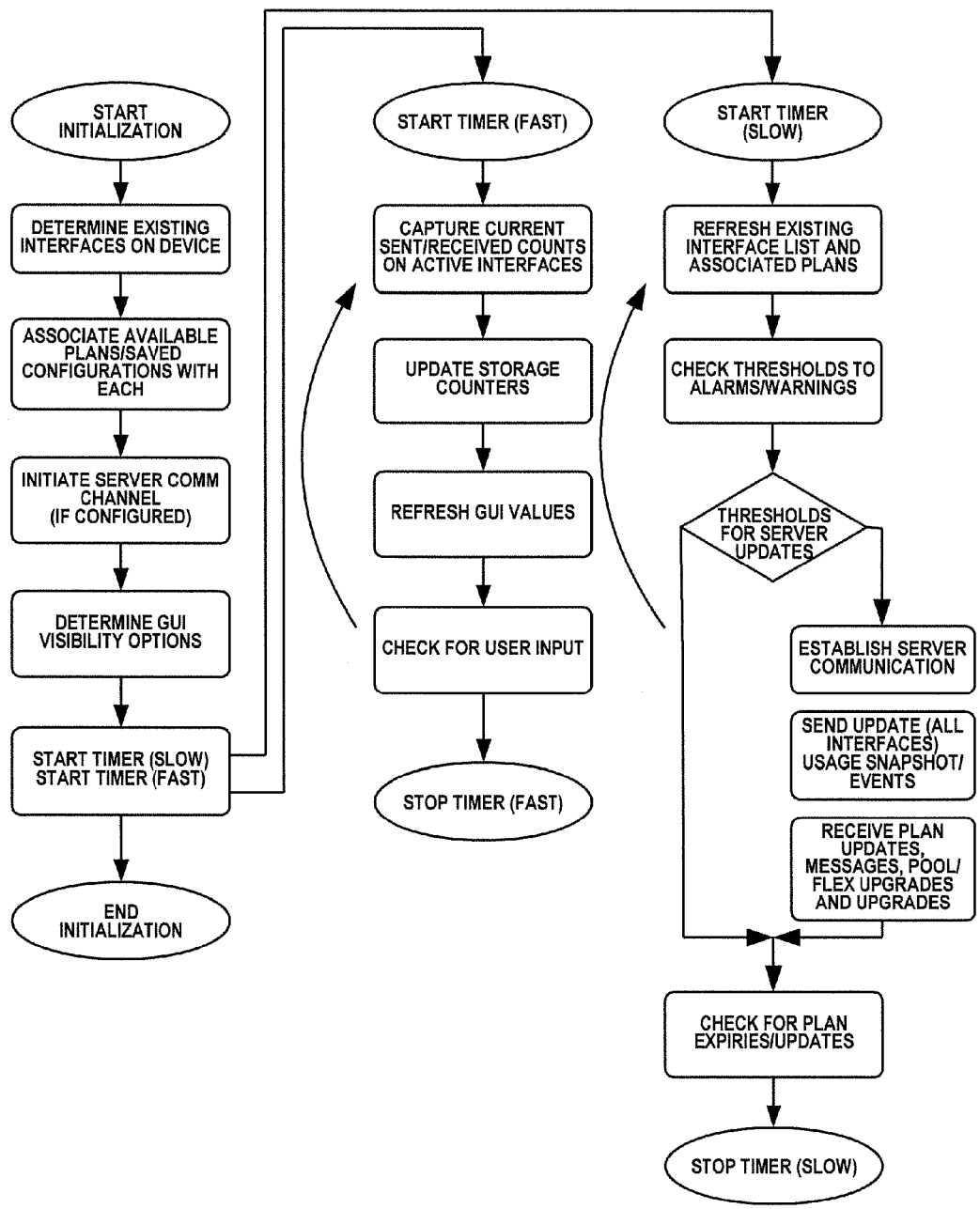
FIG. 1 is a logical representation of the state machine used by the agents who are resident on the devices deploying the telecommunications interface according to one embodiment of the present invention.

The Agent portion of the Invention, depicted in FIG. 1, is resident on each of the data collection devices (smart phones, laptops, etc.) and performs the following functions.

(1) Initialization:
  a. The Agent determines, through publicly available system calls and device specific SDKs the available interfaces on the system which are to be monitored for data traffic and usage patterns. This is typically available through an interface table from most operating systems but requires device specific knowledge and proprietary methods for some devices.
  b. The available interfaces are matched for the availability of a 'plan', which consists of user, or server specified parameters stores in non-volatile storage on the Agent.
  c. The establishment of a server communications channel (using any available communication method, although a TCP socket will be used for illustration) and report active status to the server.
  d. Determine through plans the accessibility and visibility of GUI options for the agent users.
  e. Start two timers which will loop with the following functionality (2) Timer (Fast). This timer, runs a quick interval, 1 second will be used for illustration, although this timer can be much faster on capable hardware platforms, and can be much slower, although slowing this timer will affect real time accuracy of data stored on the server.
  a. On Each Active Interface, this timer will read statistics from the interface using interface specific means (snmp statistics, RAS counters, device specific sent/received bytes, or packet counts)
  b. Update and add these raw counts to a running total that is maintained for the plan period that survives resets and device additions/removals
  c. Update and Refresh GUI values/displays
  d. Check for user specific inputs and configuration changes or requested actions.

(3) Timer (Slow). This timer runs at a slower pace, generally two minutes, although this time can also be configurable.
  a. Refresh existing interface lists to monitor for mobile devices which may have been inserted or removed.
  b. Check running counters, updated with the first timer for warning threshold crossings and display/update appropriate warnings.
  c. Check threshold settings for server communication updates. Since the server can specify a time (or data size) based transfer rate, intermediate counters are kept to monitor when the server should be send updates with this timer.
    i. Should these thresholds be crossed, the agent will establish the communication link with the server
    ii. Send the updates from each active interface which requires sending refreshed values to the server
    iii. Receive (and update) any server plan updates, messages, pooled plan remainder values, or flex plan update/upgrade plans.
  d. Check for plan period expires and refresh/reset the counters as necessary when plans are updated or expire (resetting warnings appropriately).

Figure 2:
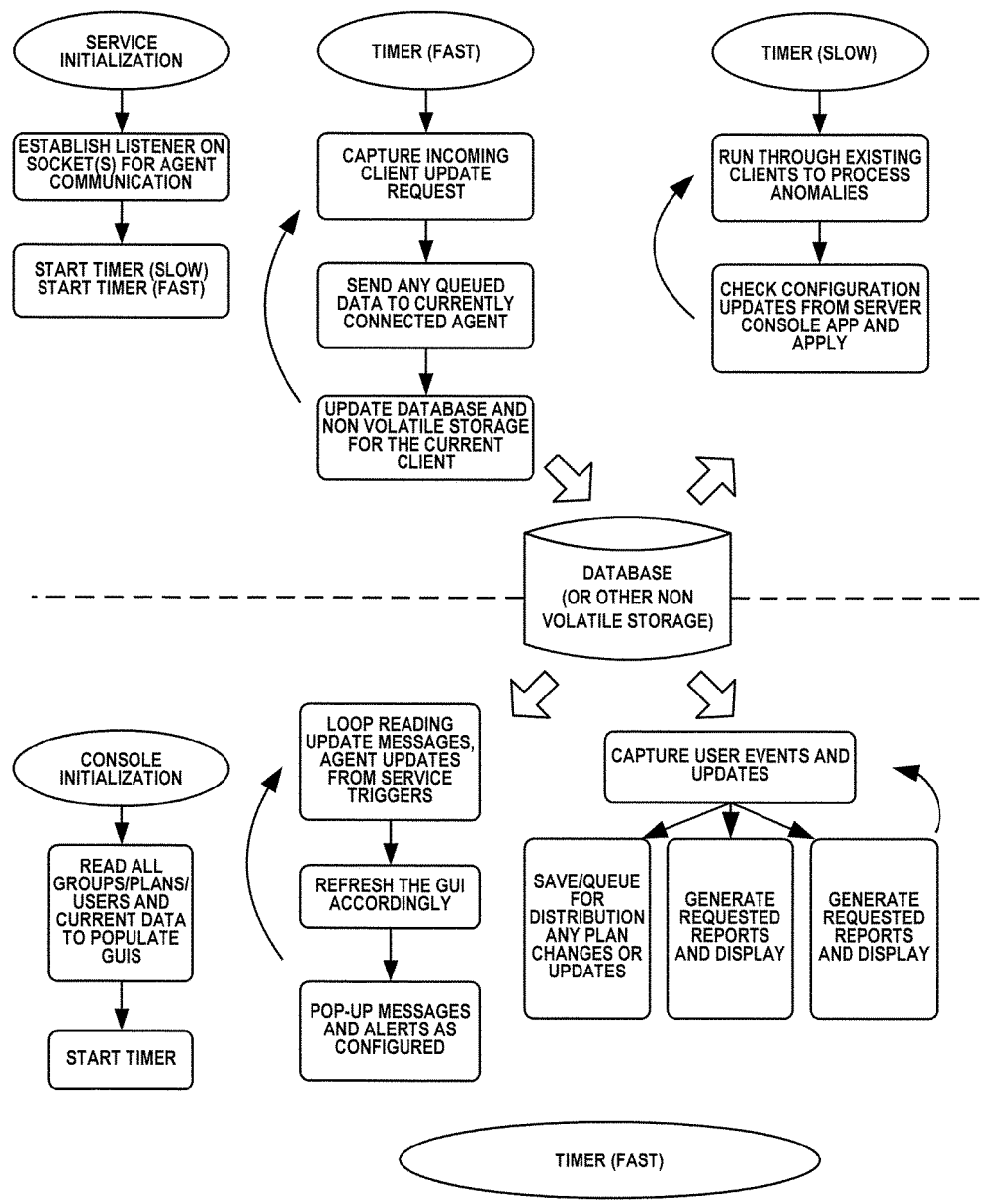
FIG. 2 is a logical representation of the centralized server system state machine according to one embodiment of the present invention.
Figure 3:
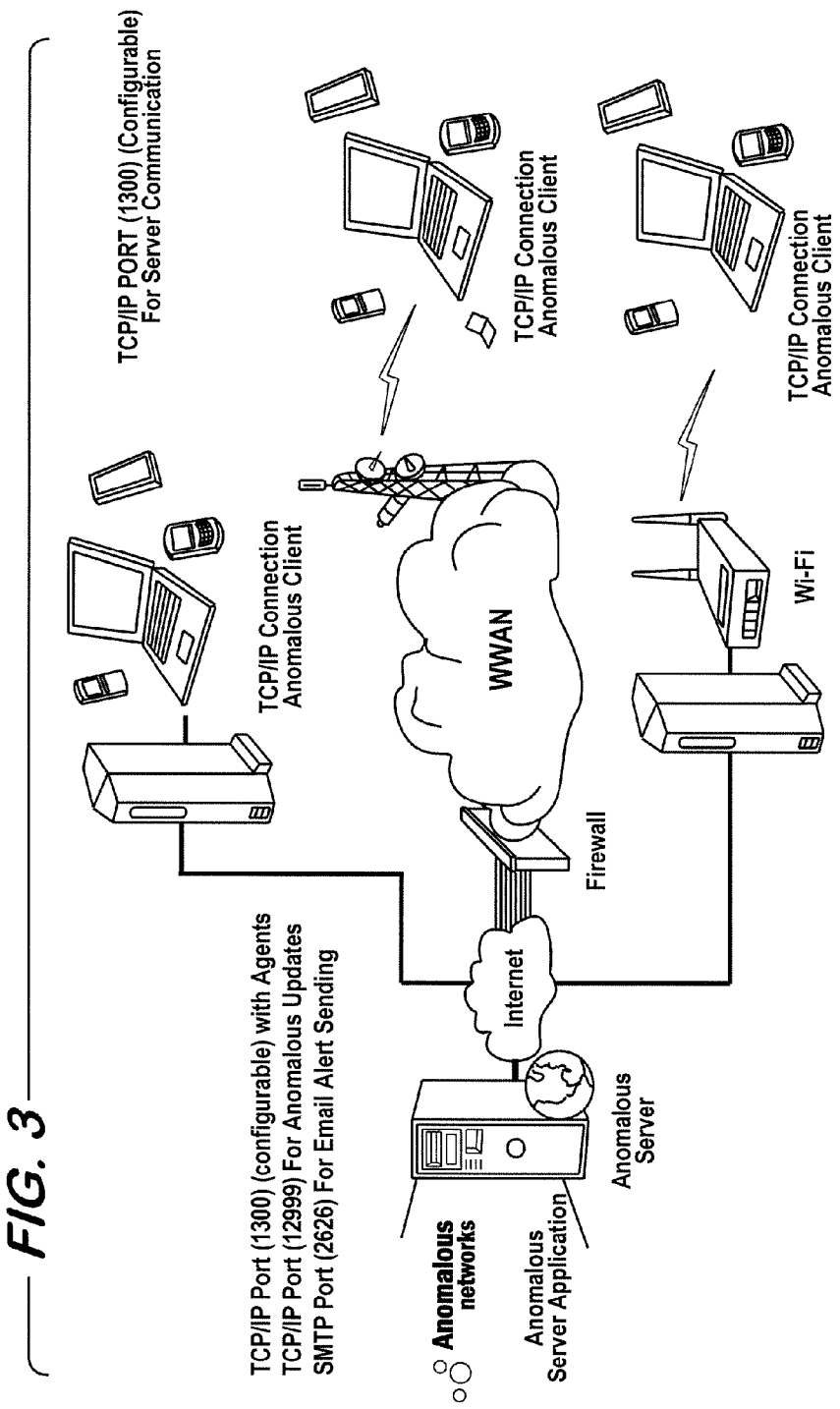
FIG. 3 is a network diagram illustrating one possible physical instantiation of the present invention depicting the various components.
Figure 5:
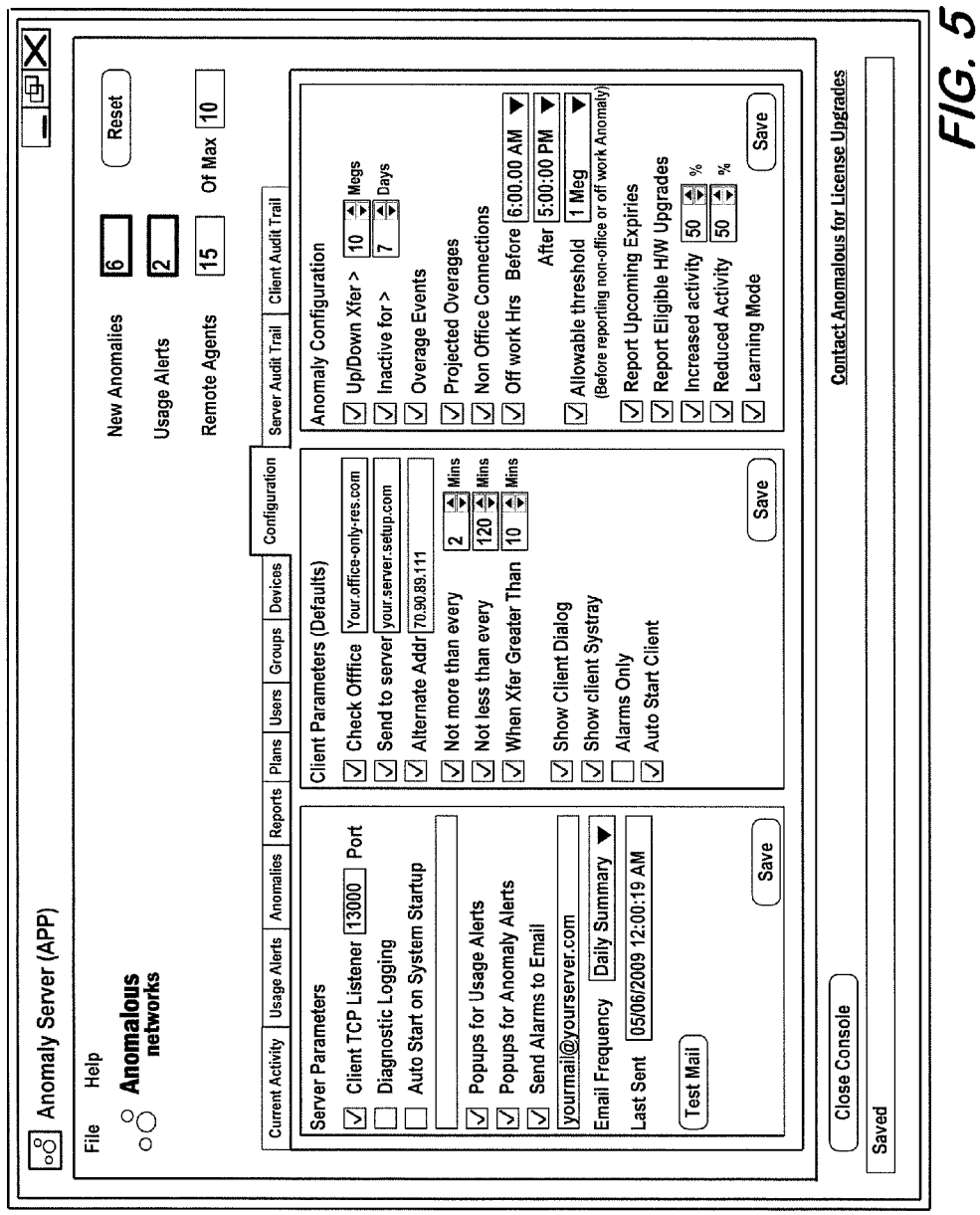
FIG. 5 is an exemplary graphical user interface according to one embodiment of the present invention.
Figure 6:
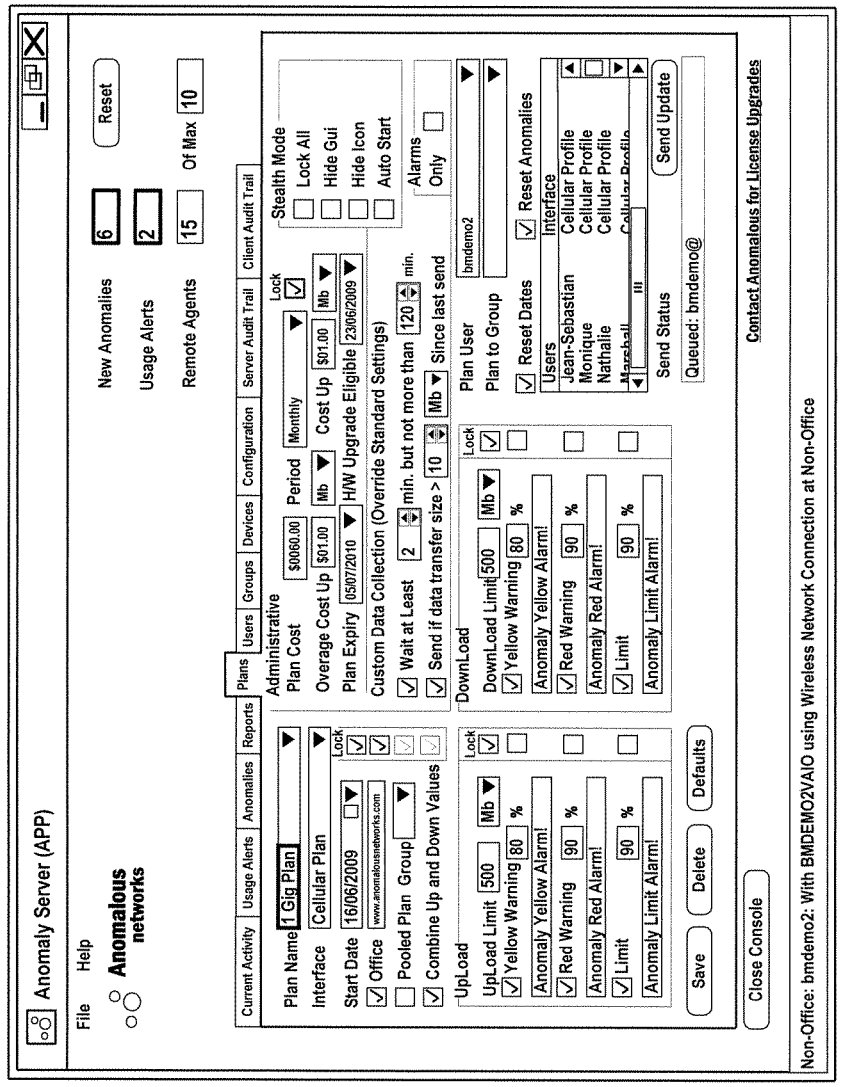
FIG. 6 is an exemplary graphical user interface according to one embodiment of the present invention.
Figure 7:
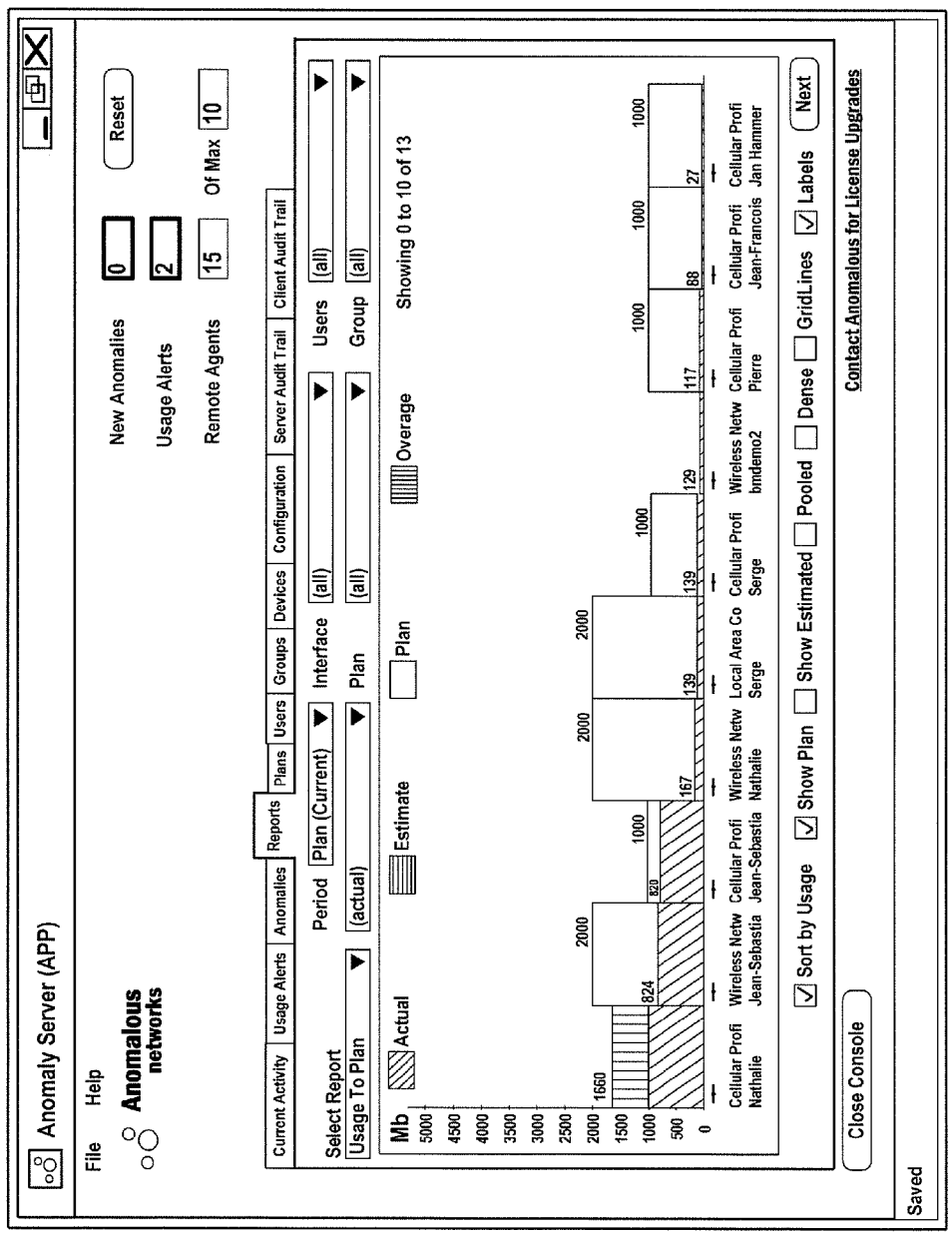
FIG. 7 is an exemplary graphical user interface according to one embodiment of the present invention.

The Server Portion of the invention provides a number of functions which run asynchronously and in separate threads, tasks and applications. The state machine for the server portion is illustrated in FIG. 2.

(1) The primary data gathering function of the server is performed in a system service but, must be an 'always on' service component which automatically re-establishes itself after power outages or maintenance. This system performs three major tasks.
  a. It monitors the communications channel(s) for incoming updates from the remote agents, and updates the contact data, the running totals. These functions are performed in an event based fashion when agent data is received on the monitored channel.
  b. Once data is received, and the running totals are updated, the new running totals, input events are stored in a local database and triggers cause the new data to run through an anomaly detection systems which will look for predefined (or learned) trends and thresholds which may trigger the creation of anomaly alarms. The anomaly determination methods and the definition of the anomalies themselves form a large part of this invention.
    i. Anomalous usage thresholds are predefined with set limits for a given time period (per plan). When these thresholds are crossed, anomaly alarms are created for large transfer activities.
    ii. Office hours are validated against preset values in the plan and off hours anomalies are triggered when outside of this range.
    iii. Projected usage is calculated based on historical averages (using weights equivalent to the amount of stored history) and the current monthly trend, and if projected overages are calculated to occur, this anomaly alarm is raised.
    iv. Office/Non-Office traffic is determined through discovery of local office resources on the agent, and reported with the data. When non-office thresholds are exceeded, this anomaly alarm is raised
    v. Anomalies are fed into an email distribution system, stored in a database (or other non-volatile memory).
  c. Events queued up for the Agent through the Anomaly Server Console application, described below, are then transmitted using the same communications channel. These can include updated plans, messages, pool plan remainder updates, flex plan updates, etc.

(2) The Server Administrative Console provides the user interface to the administrator to administer the remote agents, associated plans, and the devices and users in the system. While all the physical data is transferred between the system service (described above), the administrator queues actions and affects changes to locally stored configurations (plans, reports, user/device parameters) using this interface.
  a. Plan Creation: Plans, which are a collection of data which includes cost, limits, and time related parameters which establish the data plan with the carrier for a user, a device, or a group of users/devices, are created using a GUI.
  b. User Group Creation, which are collections of users who share a plan, or are reported in a shared function can be creates and administered
  c. Plan Distribution: Plans can be queued up for distribution using the service component above using this GUI to users or groups.

d. Reporting: Reports graphically or textually showing usage patterns, cost projections, and historical data are generated using this GUI.

Unique features of the claim are the filtering and presentation of the collected data into graphical and concise charts which will show the operator in a single view, problem areas extracted from potentially millions of data points. The sorting of projected usage by overage and cost estimation draws attention immediately to the most critical data.

An algorithm to learn and adjust anomaly detection of usage patterns with respect to transfer sizes with dynamic thresholds used for abnormal transfers is depicted below, in which the variables are defined as follows.

$T_0$: The Original transfer size criteria, whereby a max value is set to specify an anomaly threshold in a given transfer period. This is initially set to a predetermined threshold and varies according to the formula below. (i.e. if a transfer larger than $T_0$ occurs, it is flagged to be an anomaly)

T1-T10: Are the actual max readings which may or may not have exceeded this setting in a given plan period. If less that 10, (which is an arbitrary number of readings which may be adjusted to provide greater or less hysteresis causing the learning algorithm to adjust closer to peak values or closer to average values) reading have occurred, the remaining readings are set to be equal to T0. We will refer to this arbitrary number 10 as Tn1 in further descriptions.

Pn: Is the number of plan periods recorded. The formula below uses a max of 12 periods (which again is an arbitrary number of periods which may be adjusted to provide greater or less memory of history causing the learning behavior to learn faster or slower). We will refer to this arbitrary number 12 as Tn2 in further descriptions.

$T_{0/10}$: This value is provided as a Max value in the formula to never allow more that a 10% adjustment in a given plan period. Again, this number can be tuned in the algorithm to allow for a faster or slower learning adjustment rate. This 10% value will be referred to as Tn3 in further sections.

Max [T1 ... Tz] causes the subtraction of the largest of the anomalous transfers from the plan period again to avoid skewing average values by the largest of the discrepancies to average or typical activities. The Algorithm can be adapted to allow for more than one item to be removed, or to have all items greater than a given percentage removed.

$$T_0 = T_0 +/- \text{Max}(T_{0/10}, T_0 - \{\Sigma T1/z \ldots Tz/z - \text{Max}[T1 \ldots TZ]\} / \text{Max}[12, Pn])$$

To is adjusted for the next plan period dynamically for the number of periods on record or past year (12 intervals shown above for illustration, but this can be varied to have a variable hysteresis for memory and variability as described in the parameters above).

An algorithm to learn and adjust anomaly detection of usage patterns with respect to time through the hours of usage is also used. Abnormal usage is detected through a variance of initial ranges of times set as Tmino ... Tmaxo but with a fixed maximum amount of variability to prevent large shifts based on off hours work anomalies (in the example below, a cap of 1 hour variance per plan period is used, however this amount can be tuned as needed to allow for greater or less learned variability per plan period as needed.

Tmin: The acceptable minimum range of starting work, (i.e. weekdays at 8 am) before which an 'OFF-HOURS' anomaly will be raised.

Tmax: The acceptable minimum range of ending work, (i.e. weekdays at 6 pm) after which an 'OFF-HOURS' anomaly will be raised.

Tmino: The original setting for normal start time (i.e. 8 am), set by the user before learning begins.

Tmaxo: The original setting for normal stop time (i.e. 6 pm), set by the user before learning begins.

Tmin1 ... N: The N earliest snapshot readings from the days in the plan period. These may be earlier or later than the Tmino value. N can be set to '0' to never change, or 'the number of working days in the plan period' to calculate the overall average of ALL activity.

Tmax ... N: The N latest snapshot readings from the days in the plan period. These may be earlier or later than the Tmino value. N can be set to '0' to never change, or 'the number of working days in the plan period' to calculate the overall average of ALL activity.

Example 1

After a 31 day plan period with an initial configuration of Tmino=8 am, and N=5 (to take the 5 earliest periods), the system captures the earliest activity periods as (7:01, 7:10, 7:11, 7:13, 7:15) giving variance values from the Tmino value of (−59, −50, −49, −47, −45 minutes respectively, and an average variance of −50 minutes. In this case: The Tmin value for the next plan period will be 7:10 instead of 8:00 am (in this example, each of the 'out of range, or before 8 am events will trigger an anomaly)

Example 2

After a 30 day plan period with an initial configuration of Tmin0=9 am, and N=30 the system reads starting times between 9:00 and 9:30 every day with an average (of the 30 readings) being +15 Minutes Variance. The Tmin value for the next plan period will start at 9:15. (in this example, since each of the Tmin1 ... 30 events are after the Tmino setting of 9:00, there will NOT be any anomalies triggered.

Note a separate method for weekend (Sat/Sun work is performed) whereby abnormal weekend work does not skew working times during the week.

Further, the Min/Max algorithm can also be used for both startMin and StartMax and StopMin/StopMax values as a variant. In this case, starting work either before startMin or after startMax will be considered an anomaly and the times will adjust using the same learning algorithm.

$$Tmin = Tmino +/- \text{Max}(1, \{\text{Avg}(Tmin1 \ldots TminN)\})$$

$$Tmax = Tmaxo +/- \text{Max}(1, \{\text{Avg}(Tmax1 \ldots TmaxN)\})$$

Further learning of repetitive atypical events is achieved through the storage of a history of top anomalous events using the same formula and allowing for exceptions in normal anomaly reporting. This is best described with an example.

Assuming working hours are determined to be 9 to 5, the system will detect an anomaly when a user works until 6 pm. However, if after N plan periods, it is detected that the user works later every Friday, (or every last Friday of the month) say, until 9, these events will be matched against 'known anomalies' and no longer reported as such.

Unique features of the invention which are claimed in the patent include the algorithm to provide historical user data with minimal overhead.

This algorithm is based on the parameter configuration of the transfer size (TSZ) and the time limit (TLR) for reporting granularity with last send stamp of (LSS) and CurTime being the current time and MinTLR being the 'don't send faster than this value'

TimeToSend=((LSS−CurTime>TLR)||(LSS−Curtime>MinTLR && TSZ>ADS))

It is time to send data to the server only if (the time limit TLR is passed, or more data has been sent since the last time server reporting was done than the TSZ desired notification size (and at least the minimal time between reporting periods MinTLR has been exhausted)

In order to capture the relevant and timely data to be sent to the centralized server system, the following data must be captured or derived from what is available from the device deploying the communications services:

Machine Name: The PC, Device, or Modem/Card/Phone on which data is collected. To allow for shared devices between users (i.e. a shared laptop computer).

User name: The Logged in User, if applicable to allow for users that use multiple devices, or log into multiple machines. This allows for reporting by user.

Actual Up: The actual current up reading, although derivations such as 'delta up, or plan up, or incremental up would also be construed as being applicable and within the scope of the claims.

Actual Down: The actual current down reading, although derivations such as 'delta up, or plan up, or incremental up would also be construed as being applicable and within the scope of the claims.

Office: A determination of whether or not the data being send was of a personal or business nature. Multiple means of detecting whether or not we are in an office environment exists, and any of these methods would be within the scope of the claim.

Plan: The Plan being used on the device at the remote Agent. When roaming, or when using a temporary overlay plan when traveling would also be reported here.

Alarm Status: An alarm status, equivalent to the predetermined alarm states as set on the server (Yellow, Red. Limit), however additional alarm states or a subset of alarm states would also be within the claim.

Device ID: The unique device identifier (phone number, ESN, Mac Address) would be reported here, This also allows for shared phones or data modems across a number of user ids and machines ids.

Additional parameters can be captured for reporting capabilities depending on configuration and include flags available from the device such as Roaming: When a user is outside of his/her home network, using devices on partner networks, or roaming, has a distinct, usually higher, cost associated with it.

Other parameters could be user role, interface used and application used.

Unique features of the claim are based on the ability of the system to determine the optimal plan based on the current history and anomalies detected and stored and the available plans with associated parameters and costs.

PlanOptimal=Min Cost . . . applying each plan stored in the system with the historical and current data stored for the user and device Unique features of the claim are based on algorithms and method of determining projected overages based on historical averages and current usage trends within a plan period where P is the plan period, T1 is the current number of used days in the plan, and T2 is the remaining days. U1 is the usage average per same plan period collected historically over time, and U2 is the current usage so far in the plan.

Projected Use=$U2+(U1/P*T2)$

While all of the algorithms described above have applications for the field of invention narrowly defined as plan management and anomaly detection based on usage data, these algorithms can also be used in other related fields of activity such as network planning, network build out and design, etc.

The algorithms and methods described above have been for illustration purposes only, and are not intended to limit the scope of the appended claims.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A method of using a computer to detect data traffic of a mobile device, the computer performing the steps of:
   collecting usage data from the mobile device for a time period;
   setting threshold values based on a mobile device data plan and an amount of data used by the mobile device within the time period and on historical usage data of the mobile device;
   comparing the usage data against the threshold values;
   identifying an anomaly if a statistic of the usage data exceeds a corresponding threshold of the threshold values;
   generating a graphical user interface including at least one statistic of the usage data;
   overlaying at least one statistic of the existing usage data or predicted data or both onto the at least one statistic of the usage data;
   updating the threshold values based on at least one statistic of the usage data.

2. The method of claim 1, wherein at least one statistic is given a weighting based on the historical usage data and the weighting is related to an amount of stored history.

3. The method of claim 2, wherein the weighting afforded the historical usage data increases as the amount of stored history increases up to a maximum weighted percentage for the historical usage data.

4. The method of claim 1, wherein the time period corresponds to a data plan period.

5. The method of claim 1, wherein the collecting step comprises:
   reading, at a first interval, data traffic statistics from a network interface on the mobile device;
   adding the data traffic statistics to running totals on the mobile device.

6. The method of claim 5, wherein the collecting step further comprises:
   when the running totals exceed a delivery threshold, sending the running totals to the server; and
   adjusting the running totals.

7. The method of claim 1, wherein the collecting step further comprises:
   when a delivery timer expires,
   sending the running totals to the server; and
   adjusting the running totals.

8. The method of claim 1, wherein threshold values include a data limit for the given time period.

9. The method of claim 1, the computer further performing the steps of:
   extrapolating data traffic statistics to the end of the given time period;
   if a statistic of the extrapolated data traffic statistics exceeds a corresponding threshold value of the threshold values, flagging an anomaly.

10. A method of using a computer to detect data traffic of a mobile device, the computer performing the steps of:

collecting from the mobile device, usage data relating to data usage for the mobile device for a given time period;

setting threshold values based at least in part on a mobile device data plan and an amount of data used by the mobile device within a set time period;

comparing the usage data against the threshold values;

identifying a statistic of the usage data exceeding a corresponding threshold of the threshold values;

generating report based on the identified statistic wherein the report includes a comparison between historical usage data associated with a second given time period to the usage data, the second given time period prior to the given time period;

presenting the report on a Graphical User Interface (GUI) so that a user of the mobile device can assess changes in their data usage in order to avoid overages; and updating the threshold values based on a running average of the statistic of the usage data.

11. The method of claim 10 wherein the threshold values are further set based on historical usage data of the mobile device, where weighting afforded the historical usage data in comparison to the amount of data used by the mobile device within the set time period is related to the amount of stored history.

12. The method of claim 11, wherein the weighting afforded the historical usage data increases as the amount of stored history increases up to a maximum weighted percentage for the historical usage data.

13. The method of claim 10 wherein the identified statistic is average data usage for the mobile device over more than one set time period.

14. The method of claim 10, wherein the updating of the threshold values is based on formula I, $$T_0 = T_0 + \text{Max}\left[\frac{T_0 + \Delta_{max}}{100}, T_0 \frac{\left(\sum_{i=1}^{N} T_i - \text{Max}(T_1, \ldots, T_N)\right)}{N-1}\right]$$

wherein $T_0$ is a current threshold value;

$\Delta_{max}$ is the maximum change of the threshold value, expressed as a percentage;

$T_i$ is the value of a corresponding data traffic statistic i time periods prior to the current period; and N is the number of time periods used to compute the updated threshold.

15. The method of claim 10, wherein the given time period corresponds to a data plan period.

16. The method of claim 10, wherein the collecting step comprises:

reading, at a first interval, data traffic statistics from a network interface on the mobile device;

adding the data traffic statistics to running totals on the mobile device.

17. The method of claim 16, wherein the collecting step further comprises:

when a delivery timer expires, sending running totals of data usage to a server wherein the collecting step is performed at the server; and adjusting the running totals.

18. The method of claim 10, wherein the collecting step further comprises:

when a delivery timer expires, sending the running totals to the server; and adjusting the running totals.

19. The method of claim 10 wherein threshold values include a data limit for the given time period.

20. The method of claim 10, the computer further performing the steps of:

extrapolating data traffic statistics to the end of the given time period;

if a statistic of the extrapolated data traffic statistics exceeds a corresponding threshold value of the threshold values, flagging an anomaly and presenting the anomaly on the Graphical User Interface (GUI).

* * * * *